United States Patent Office 3,745,030
Patented July 10, 1973

3,745,030
INSULATING AND CORROSION PROTECTIVE MATERIAL
Roy E. Nelson, Salt Lake City, Utah, and Charles William Matthews, Hinsdale, Ill., assignors to American Gilsonite Company, Salt Lake City, Utah
No Drawing. Continuation of application Ser. No. 800,730, Feb. 19, 1969. This application May 27, 1971, Ser. No. 147,645
Int. Cl. C09d 5/08
U.S. Cl. 106—14         7 Claims

ABSTRACT OF THE DISCLOSURE

Insulation of pipes and similar structures to prevent corrosion and retard the flow of heat is accomplished by surrounding the structure with particulate coal.

This application is a continuation-in-part application of Nelson application Ser. No. 800,730, filed Feb. 19, 1969 and incorporated herein by reference.

BACKGROUND OF THE INVENTION

In the past, pipes and other structures, particularly underground structures, have been protected from corrosion and insulated to retard the flow of heat from the structure by particulate materials such as Gilsonite and other suitable water resisting materials. The asphaltic insulating materials and their method of application to the underground structures are described in U.S. Pats. Nos. 2,668,125 and Re. 25,757.

In general, insulation by this method has been satisfactory at low temperatures. In fact, successful insulation at temperatures above 400° F. has been obtained with Gilsonite. However, as the temperature approaches that of steam, i.e., about 200° F., a breakdown in the corrosion protection properties of the asphaltic material may occur if the layer of insulation is not sufficiently thick and when adverse soil moisture conditions are encountered. It has been felt that this breakdown is due to a fusion of the asphaltic materials followed by sintering. Sintering reduces water retardancy, primarily because it results in a brittle coating on cooling which may crack and allow water to penetrate through the coating.

Fused and sintered asphaltic materials provide adequate protection against corrosion due to moisture as long as the coating remains intact. However, a radical temperature change such as cooling of a pipe, which normally carries fluid at 400° F., to ambient temperature results in considerable pipe movement. With steel pipe this movement is about 3 inches per 100 feet of length. During the process of cooling of the pipe, the surrounding insulation also cools. At normal operating temperature, the fusion zone is plastic and flexible protecting the sintered zone from pipe movement relative to the insulation. At lower temperatures, usually in the range above 200° F., the plastic material becomes hard and brittle. As the pipe continues to cool, its contraction causes cracks to appear in the brittle fused and sintered material. These cracks are not self-healing and during later operation of the system are a ready pathway for corrosive groundwater to reach and attack the protected pipe. Thus, there has been a need for an insulating material which will show good water retardancy and heat insulation, such as Gilsonite, at lower temperatures, but also retain these corrosion resistant properties at higher temperatures.

Gilsonite also tends to sinter upon being wetted at temperatures above 212° F. Thus, the passage of steam through Gilsonite insulation will cause sintering. As a result, passage of steam through the Gilsonite may render it ineffective as an insulation.

SUMMARY

It is thus an object of the present invention to provide a material to protect pipes and other structures from corrosion.

It is a further object to provide a heat insulating material.

It is a still further object of the present invention to provide a flexible packing material.

It is another object of the present invention to provide an insulating material which will not lose its resistance to water penetration upon heating to high temperatures and cooling.

A further object of the present invention is to provide an insulating material which will not lose its resistance to water penetration upon exposure to passage of steam for prolonged periods of time.

It has now been discovered that these and other objects of the invention can be accomplished by covering the surface of the structure with a layer of particulate coal. This material has excellent resistance to penetration of water through the bed of granulated particles. The particulate bed is unaffected in so far as fusion or sintering may occur up to temperatures in excess of 494° F., a temperature greater than that of most systems to which it may be applied. The bed of mobile, discrete coal particles cannot be disrupted by pipe movements during heating or cooling cycles because of the tendency of the bed to act as a semi-fluid medium. Without massive cracking occurring in the insulating bed, the water resistant properties of the granulated insulating material prevail in retarding penetration of water to the structure surrounded by the bed, thus preventing the occurrence of corrosion.

DESCRIPTION OF THE PREFERRED EMBODIMENTS

According to the present invention, insulation of structures is accomplished by covering or surrounding them with a layer of discrete mobile particles of coal. Coal is formed from plant substances, preserved from complete decay in a favorable environment and later altered by chemical and physical agencies. Chemistry of Coal Utilization, supplementary volume, H. H. Lowry, editor, John Wiley & Sons, 1963, in chapter 1 by Bryan C. Parks, Bureau of Mines, U.S. Department of Interior. Asphaltites, such as Gilsonite, on the other hand, are derived from the metamorphosis of petroleum. Asphalts and Allied Substances, volume 1, by Herbert Abraham, D. Van Nostrand Co., Fifth edition, 1956.

There are some very distinct differences between asphaltites such as Gilsonite and coal. For example, asphaltites are free from oxygenated bodies whereas coal contains oxygenated bodies. Gilsonite is a fusible material whereas coal is infusible. Additionally, Gilsonite is soluble in carbon disulfide whereas coal is insoluble in carbon disulfide, Asphalts and Allied Substances, supra. A table illustrating the differences and properties between coal and Gilsonite is set forth below.

| | Gilsonite | Bituminous coal |
|---|---|---|
| Specific gravity (g./cc.) | 1.03–1.10 [b] | 1.12–1.35 [a] |
| Ash (percent) | 0.5 maximum | 5.0–10.0.[a] |
| Volatile matter (percent) | 80–82 [b] | 13–40.[a] |
| Fixed carbon (percent) | 13–20[b] | 31–68.[a] |
| Softening point (° F.) | 270–400 [b] | Infusible.[c] |
| Solubility in CS$_2$ (percent) | Largely soluble [c] | Largely insoluble.[c] |

Sources:
[a] Steam, Its Generation and Use, Babcock and Wilcox Company, 1960.
[b] Bituminous Materials: Asphalts, Tars and Pitches, vol. 1, Arnold J. Hoiberg, 1964.
[c] Asphalts and Allied Substances, vol. 1, Herbert Abraham, 1960.

There are various classifications, or types, of coal. In general, the classification is based upon the age or state of decomposition of the coal. The first state through which the decomposing cellulose passes is peat. It then is transformed to lignite, then to bituminous coal, and finally to anthracite coal. Further transformation of the anthracite coal would result in graphite.

Although the reasons for the formation and transformation in coal are not fully understood, it is thought that coal originally begins as cellulose, a carbohydrate having the formula $(C_6H_{10}O_5)_n$. However, as coal goes through the change from peat to anthracite, the percentage of hydrogen and oxygen diminishes as carbon correspondingly increases. The bituminous coals contain a substantial portion of volatile matter.

Coals are classified by A.S.T.M. according to their rank, on a mineral-free basis, according to the amount of fixed carbon in the coal and the B.t.u. values. The main categories of coal are anthracite (more than 86 percent fixed carbon), bituminous (less than 86 percent fixed carbon but more than 11,000 B.t.u. per pound), sub-bituminous and lignite. In the bituminous category, fixed carbon is measured down to 31 percent. Thus, it can be seen that a classification such as "bituminous" covers a wide range of fixed carbon values.

In general, the bituminous and sub-bituminous types of coal are preferred for the practice of the present invention. Lignite coals often tend to dissolve in the presence of water which renders them less desirable as an insulating material. However those lignites which do not react adversely in the presence of water may be used in this invention. Although anthracite does provide some degree of insulation and corrosion protection, it is much less effective than the bituminous, sub-bituminous and lignite coals.

In general, it has been found coals with the following ranges of properties are suitable for insulation:

|  | Weight percent | |
| --- | --- | --- |
|  | Minimum | Maximum |
| Moisture | 0.1 | 7.5 |
| Ash | 3.5 | 10.1 |
| VCM | 15 | 49 |
| Fixed carbon | 35 | 69 |

It should be understood that all coals do not have a uniform composition and that a bituminous coal, for example, may vary in its composition from that mined in another location. Thus, some evaluation of the water retardancy properties of the coal may advantageously be carried out. However, a suitable coal can be readily determined according to simple test procedures which are described herein. Thus, one skilled in the art can readily determine the suitable bituminous, sub-bituminous or lignite coal which will be satisfactory for a particular insulating application.

U.S. Pat. No. Re. 25,757, the disclosure of which is incorporated herein by reference, stressed the particle size of the asphaltic insulating material used. Although such limitations on the particle size of coal are not necessary in practicing the present invention, it has been found that the water retardancy does increase with decreasing particle size of the coal particles. Thus, water retardancy considerations alone would dictate an extremely small particle size. Normally, it is easier to compact the coal if the particle size is somewhat larger and therefore as a matter of practical convenience, it may be desirable to balance the load-bearing characteristics of the coal particles against the water retardancy characteristics, and select a coal of intermediate particle size.

A suitable size distribution which provides both excellent load bearing characteristics and water retardancy is as follows:

| Tyler screen: | Cumulative weight Percent |
| --- | --- |
| +65 | 3.5 |
| +200 | 36.4 |
| +400 | 63.8 |
| −400 | 36.2 |

It can be seen that the above distribution of particle sizes falls far outside the preferred range set forth in Morse U.S. Pat. No. Re. 25,757 for Gilsonite. The particle size of the coal in the above table is much smaller than the smallest acceptable particle size for Gilsonite as set forth in U.S. Pat. No. Re. 25,757. A surprising feature of the present invention is that coal having a relatively small particle size will have a much greater compressive strength than Gilsonite of similar particle size. That fact makes it possible to use small particle sizes of coal in order to obtain high water retardancy and yet obtain adequate load bearing characteristics.

In general, the particles size of coal used in this invention should be such that when maximum water retardancy is desired a substantial amount of the particulate coal will pass a Tyler 35 mesh screen and preferably all of the particles will pass a Tyler 35 mesh screen and substantially all of the particles will pass a Tyler 65 mesh screen. Water retardancy increases as the size of the particles decreases. It is important to have a certain mixture of particle sizes to get the optimum combination of water retardancy and load bearing characteristics. Preferably a significant portion, about 30 to 40 percent should pass a 400 mesh screen.

When a lesser water retardancy for the application is needed but a more stable, higher load bearing insulation bed is required, as much as 40 percent or more of the coal particles may be greater than 20 mesh and finer than 4 mesh.

Both the type of coal and particle size determine the amount of water retardancy of a particulate coal. Thus, for any particular coal the suitability for water retardancy can best be determined by the rapid water retardancy test method described in Example 1. Generally, a retardancy of at least about 24 inches is desired and preferably the retardancy is at least about 60 inches.

Underground pipelines frequently must be insulated to prevent corrosion and heat loss. The invention may also be used for protecting underground tanks, ducts, conduits, building foundations, etc. Furthermore road beds, rail beds and bridges may be insulated to protect from ground water intrusion and to reduce freezing and heaving conditions. Of course, it should be understood that larger particle sizes would be required for high load bearing requirements. Particulate coal may also be used for structures above the surface of the earth for both corrosion protection and heat insulation. The structuure to be protected is covered with a layer of coal particles. The particles may be compacted if desired. In general, the coal particles may be used in the same manner as the asphaltites described in U.S. Pat. No. Re. 25,757.

The coal particles may be mixed with other materials to modify the properties of the insulation. For example, improved heat insulation is attainable by distributing hollow glass spheres among the coal particles. Additionally, various other additives may be included to modify the properties of the coal, e.g., load bearing properties, combustibility, etc.

The amount of insulating material in contact with the underground structure is determined in part by the amount of heat insulation required. The thickness of the insulation can be varied to get the desired thermal insulation effect. The insulation may be as thick as necessary to obtain the desired thermal insulation. The minimum thickness in practice is often determined by the thickness which affords adequate compaction. In general 2.5 inches will provide adequate compaction.

If desired, the coal can be treated with oil to reduce dust problems. The treatment with oil also tends to improve water retardancy from about 10 to 20 percent.

Improved water retardancy can also be obtained by placing a layer of material such as hydroxyethyl cellulose or bentonite around the outer surface of the insulation.

Thermal insulation may be improved by placing insulating panels such as styrofoam around the outer surface of the granular insulation.

Structural heat insulation elements may also be made according to the present invention by packing the granular coal firmly within a container and then evacuating the container, e.g., from about 1 to about $1 \times 10^{-4}$ mm. Hg. The thermal conductivity of such a structurue may be in the range of from about 0.005 to about 0.001 B.t.u./hr.$\times$ft.$^2\times°$ F./ft. The structural strength of the coal would permit containers to be manufactured using a relatively thin metal skin. Collapsing of the sides of the container is prevented by the strength of the coal. Such insulated panels could be used around tanks of liquified gas when held at atmospheric pressure. Additionally, such structure could be used in floors, walls, and ceilings of cold storage houses, beneath ice rings, etc.

In order to get the high compressibility obtainable with the present invention, it may be desired to compact the coal using a vibrator or other compacting means. Compaction can be obtained using a rod-type concrete vibrator with a head 1 to 1½ inches in diameter. Compaction is carried out by inserting such a vibrator vertically or at a slight angle into the bed of coal and allowing vibration of the adjacent insulation for about 30 seconds. Compaction can also be obtained by using vertical strokes of a shovel, spade, or a similar instrument. Further, any other suitable vibrating means may be used for compacting the coal insulation.

The nature of the present invention can be more fully comprehended by reference to the examples which follow:

EXAMPLE 1

Ground bituminous coal was compared with two insulating materials commercially available. One of the insulating materials was ground limestone coated with stearic acid and the other was granulated asphaltite of the type described in U.S. Pat. No. Re. 25,757. The K factor, B.t.u./hr.$\times$ft.$^2\times°$ F./ft., bulk density and sintering temperature of each material was determined. Water retardancy was determined by subjecting a cylindrical bed of the insulating material to a head of water from below, which was increased at the rate of one inch every two minutes. Penetration of water into the insulating material is determined by measuring a decrease in electrical resistance of the bed. This method of measuring water retardancy is termed the rapid or accelerated method, and is described in U.S. Pat. No. Re. 25,757, the disclosure of which is incorporated herein by reference. The method used in this application differs only from that of said Pat. No. Re. 25,757 in that the water head is increased one inch every two minutes rather than every five minutes. The properties of the material are set forth in Table I.

TABLE I

| Description | Coated limestone | Sized Gilsonite | Ground coa |
|---|---|---|---|
| Published temperature range of application, ° F. | 480 | 35–460 | |
| K factor, B.t.u./hr.$\times$ft.$^2\times°$ F./ft. | 0.065 | 0.054 | 0.044 |
| Bulk density compacted in trench, lbs./cu. ft. | 70 | 49 | 48 |
| Sintering temperature, ° F. | 190 | 190 | >450 |
| Water retardancy, rapid method, inches | +60 | 50 | +60 |
| Tyler screen analysis, weight percent accumulative; mesh: | | | |
| +20 | | 40 | |
| +80 | | 66 | |
| +100 | | | Nil |
| +150 | | | 15.1 |
| +200 | | | 30.9 |
| +270 | | | 45.6 |
| +400 | | | 57.4 |
| Minus 80 | 34 | | |
| Minus 400 | | 100 | 42.6 |

The above materials were packed to give 4 inches of insulation around a 2-inch diameter pipe, heated electrically to 400° F. When the test was terminated, the coated limestone was tightly sintered from the pipe outward for 2½ inches, loosely sintered for ¾ inch farther and unsintered for the outer ¾ inch. The Gilsonite was sintered for 3 inches and unsintered for the outer inch. The coal was completely unsintered. Sintering causes loss of corrosion protection due to cracks in the sintered material which allow water penetration.

EXAMPLE 2

The effect of particle size of a high volatile bituminous coal on water retardancy by the permanent, or long time head test was determined in this experiment. Water retardancy was determined according to the permanent head test. That test is the same as the accelerated method described in Example 1, except that when a given head is attained, 60 inches in the present case, no further changes are made and the time to water penetration is measured. The permanent method is fully set forth in U.S. Pat. No. Re. 25,757. The Tyler Screen Analysis is also given. The results are set forth in the table below.

TABLE II

| Particles finer than | 35 mesh | 65 mesh | 80 mesh | 100 mesh |
|---|---|---|---|---|
| Water retardancy at 60 inches head, time to failure | ¹ 2 | ¹ 15 | ² 3 | >² 28 |
| Weight percent accumulative Tyler Screen Analysis: | | | | |
| +100 mesh | 44.1 | 15.9 | 5.9 | 2.2 |
| +150 mesh | 57.0 | 34.5 | 21.4 | 25.5 |
| +200 mesh | 64.3 | 46.0 | 32.7 | 39.1 |
| +270 mesh | 71.6 | 57.7 | 45.5 | 52.5 |
| +400 mesh | 77.9 | 66.2 | 56.0 | 55.2 |
| −400 mesh | 22.1 | 33.8 | 44.0 | 44.8 |

¹ Hours.
² Days.

EXAMPLE 3

The water retardancy of various coals (anthracite, high volatile bituminous coal mined in Utha, high volatile bituminous coal mined in Colorado, and sub-bituminous coal) was determined by the rapid method in accordance with the procedures of Example 1. The characteristics of the coal and results are set forth below.

TABLE III

| | Anthracite | High volatile bituminous— | | Sub-bituminous | Lignite |
|---|---|---|---|---|---|
| | | Utah | Colorado | | |
| Moisture, weight percent | 0.6 | 1.2 | 2.0 | 13.9 | 30.2 |
| Ash | 9.3 | 6.5 | 5.7 | 7.0 | 8.3 |
| Volatile matter | 8.3 | 42.3 | 37.5 | 39.4 | 40.6 |
| Fixed carbon | 81.8 | 50.0 | 54.8 | 39.7 | 37.1 |
| Water retardancy for −100 mesh, inch | 1 | +60 | +60 | 14.0 | 34.0 |
| Sinter at 494° F | (¹) | None | None | (¹) | None |

¹ Not run.

EXAMPLE 4

A long term water retardancy test was carried out using high volatile bituminous coal from Utah. A 2 inch diameter steel pipe was insulated with an envelope of 4 inch insulation on the bottom and sides and 5½ inch insulation on the top. The insulation top surface was covered with an inch of sand to exclude air. Screen analysis of the insulation was:

| Mesh: | Wt. percent cumulative |
|---|---|
| +65 | nil |
| +100 | nil |
| +150 | 15.1 |
| +200 | 30.9 |
| +270 | 45.6 |
| +400 | 57.4 |
| −400 | 42.6 |

The pipe was electrically heated and was controlled at 410° F. for 33 days. Temperatures through the insulation reached equilibrium at these levels:

| Inches from pipe wall: | Temperature, ° F. |
|---|---|
| 0 | 411 |
| ½ | 335 |
| 1 | 297 |
| 1½ | 258 |
| 2 | 236 |
| 2½ | 202 |
| 3 | 184 |

At the end of the test, temperatures were permitted to drop to ambient. The insulation bed was removed and its structure was carefully examined. Throughout the bed the material was loose and there was no indication of sintering. Material from 0 to 2 inches from the pipe was carefully collected. This was tested for water retardancy and 60+ inch results were obtained. The entire thickness of the insulation was effective in retarding water penetration, not just the outer shell which is the case with some commercial products.

EXAMPLE 5

In this example, a water retardancy test which can be used for values of greater than 60 inches was employed. The sample of insulating material is packed into a two-inch stainless steel pipe 5 inches long with a 40 micron stainless sintered metal plate welded to one end. A resistance probe of stainless steel comprising a ½ inch diameter, ⅛ inch thick stainless steel disc mounted on a ⅛ inch diameter stainless steel rod is inserted through a non-conducting ferrule in the sintered plate so that the disc is ¾ inch above the plate. The insulating material is compacted to a level 1¼ inches above the probe. One-fourth to ½ inch of gravel are then placed over the sample of material and the sample is tamped. A stopper having a ¼ inch pipe through it is then placed in the top of the pipe. Fifty ml. of water are then added and air pressure is imposed on the water through the pipe in the top of the apparatus. The resistance between the wall of the pipe and the probe is measured. The pressure on the cylinder is increased at the rate of 0.2 p.s.i. every two minutes and the resistance is determined. Failure is taken as the point where the measured resistance is less than 10 megohms. Using this method of determining water retardancy, the following materials were tested according to this method with the following results as shown in Table IV below.

TABLE IV

|  | Gilsonite A | Gilsonite B | Coal |
|---|---|---|---|
| Tylor screen, cumulative, weight percent: | | | |
| +20 | 35.1 | | |
| +65 | | 0.7 | Trace |
| +80 | 63.0 | | |
| −80 | 37.0 | | |
| +200 | | 28.4 | 35.7 |
| +400 | | 57.1 | 66.9 |
| −400 | | 42.9 | 33.1 |
| Water retardancy, downflow method, inches of water | 83 | 139 | 116 |

EXAMPLE 6

The coal and Sample A of the Gilsonite from Example 5 were tested to determine various properties which are set forth below.

TABLE V

|  | Gilsonite | Coal |
|---|---|---|
| Coefficient of thermal conductivity at mean temperature of 200° F., per foot of thickness | 0.060 | 0.058 |
| Water repellency, downflow method, inches of water | 83 | 116 |
| Sintering temperature, °F | 180 | (¹) |
| Maximum operating temperature with available raw material, °F | 300 | 460 |

¹ Does not sinter.

The Gilsonite sizing is that of Morse U.S. Pat. No. Re. 25,757.

It should be understood that the foregoing examples are merely illustrative and should not be taken as limiting the scope of the invention. Thus, the present invention can be used on a wide variety of coals and with a wide variety of particle sizes. The scope of the invention should thus be limited only by the lawful scope of the claims which follow.

What is claimed is:

1. The method of providing a structure with a flexible layer for corrosion protection and heat insulation consisting essentially of surrounding at least a part of the structure with discrete mobile particles of granular material selected from the group consisting of bituminous coal and sub-bituminous coal to form an insulating layer having a bulk density of at least about 48 lbs./ft.$^3$, remaining resistant to sintering at temperatures of up to about 460° F. and having the coefficient of thermal conductivity of about 0.06 B.t.u./hr.$\times$ft.$^2\times$° F./ft., said material having a water retardancy of at least 60 inches when imposed at the rate of one inch in two minutes, and when substantially all of the particles pass a Tyler 65 mesh screen and about 30% of the particles pass a Tyler 400 mesh screen.

2. The method of claim 1 wherein said layer is at least about 2.5 inches thick.

3. The method of claim 1 wherein said granular material is bituminous coal.

4. The method of claim 1 wherein said granular material is sub-bituminous coal.

5. An insulated article comprising a metal article and a flexible layer of discrete mobile particles of granular material in direct contact with and covering at least a portion of the surface of said article in order to protect the article from corrosion and to provide heat insulation, said material consisting of coal selected from the group consisting of bituminous and sub-bituminous coal, said layer having a bulk density of at least about 48 lbs./ft.$^3$, remaining resistant to sintering at temperatures of up to about 460° F. and having the coefficient of thermal conductivity of about 0.06 B.t.u./hr.$\times$ft.$^2\times$° F./ft., said material having a water retardancy of at least 60 inches when imposed at the rate of one inch in two minutes, and when substantially all of the particles pass a Tyler 65 mesh screen and about 30% of the particles pass a Tyler 400 mesh screen.

6. The insulated article of claim 5 wherein said coal is sub-bituminous coal.

7. The insulated article of claim 5 wherein said coal is bituminous coal.

References Cited

UNITED STATES PATENTS

| Re. 25,757 | 4/1965 | Morse | 106—281 X |
| 3,468,687 | 9/1969 | Thomas | 106—14 X |
| 3,385,802 | 5/1968 | Trieschock | 117—135 X |
| 2,787,557 | 4/1957 | Christensen et al. | 117—135 X |
| 2,395,041 | 2/1946 | Fair, Jr. | 106—273 X |

JOSEPH L. SCHOFER, Primary Examiner

D. A. JACKSON, Assistant Examiner

U.S. Cl. X.R.

106—273, 280, 284; 117—94, 135